US011338930B2

(12) United States Patent
Grall et al.

(10) Patent No.: US 11,338,930 B2
(45) Date of Patent: May 24, 2022

(54) AIRCRAFT ENGINE NACELLE

(71) Applicant: Safran Nacelles, Gonfreville l'Orcher (FR)

(72) Inventors: Loïc Grall, Gonfreville l'Orcher (FR); Mélody Seriset, Gonfreville l'Orcher (FR); Alexis Heau, Gonfreville l'Orcher (FR); Benjamin Brebion, Gonfreville l'Orcher (FR); Olivier Kerbler, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 30 days.

(21) Appl. No.: 16/907,346

(22) Filed: Jun. 22, 2020

(65) Prior Publication Data
US 2020/0317355 A1 Oct. 8, 2020

Related U.S. Application Data

(63) Continuation of application No. PCT/FR2018/053460, filed on Dec. 20, 2018.

(30) Foreign Application Priority Data

Dec. 21, 2017 (FR) ...................................... 1762849

(51) Int. Cl.
*B64D 29/00* (2006.01)
*F02K 1/09* (2006.01)
*F02K 1/70* (2006.01)

(52) U.S. Cl.
CPC ................ *B64D 29/00* (2013.01); *F02K 1/09* (2013.01); *F02K 1/70* (2013.01)

(58) Field of Classification Search
CPC ..... F02K 1/09; F02K 1/64; F02K 1/16; F02K 1/70; F02K 1/72; F02K 1/763; B64D 29/00
See application file for complete search history.

(56) References Cited

U.S. PATENT DOCUMENTS 3,280,562 A * 10/1966 Theits ...................... F02K 1/72
60/229
3,829,020 A * 8/1974 Stearns ..................... F02K 1/09
239/265.29
(Continued)

FOREIGN PATENT DOCUMENTS

FR 2980173 3/2013
WO 2014091140 6/2014
(Continued)

OTHER PUBLICATIONS

International Search Report for International Application PCT/FR2018/053460, dated Mar. 18, 2019.

*Primary Examiner* — Craig Kim
(74) *Attorney, Agent, or Firm* — Burris Law, PLLC

(57) ABSTRACT

A nacelle of an aircraft turbofan engine including an air inlet upstream from the engine, a median section configured to surround a fan of the engine and delimited on the outside by a fan cowl supported by a fan housing to which it is attached at the upstream portion, a downstream section delimiting an annular flow path in which the air is configured to flow and housing thrust reversal devices, the thrust reversal approach including a movable cowl associated with at least one actuator for moving the movable cowl between a direct jet position, in which it provides the aerodynamic continuity of the nacelle and an indirect jet position in which it opens up a passage in the nacelle by uncovering cascade vanes arranged around this flow path that receive the cold air flow to return it towards the outside and forwards, the cascade vanes being attached to the movable cowl.

15 Claims, 3 Drawing Sheets

(56) References Cited

U.S. PATENT DOCUMENTS

| | | | |
|---|---|---|---|
| 6,167,694 B1 | 1/2001 | Davies | |
| 7,484,356 B1* | 2/2009 | Lair | F02K 1/72 60/230 |
| 8,245,516 B2* | 8/2012 | Song | F02K 1/763 60/770 |
| 8,613,398 B2* | 12/2013 | Calder | F02K 1/763 239/265.19 |
| 9,551,298 B2* | 1/2017 | Binks | F02K 1/09 |
| 9,982,627 B2* | 5/2018 | Teia Dos Santos Mendes Gomes | F02K 1/763 |
| 10,018,151 B2* | 7/2018 | Nakhjavani | F02K 1/72 |
| 10,473,057 B2* | 11/2019 | Aten | F02K 1/56 |
| 10,690,088 B2* | 6/2020 | Ridray | F02K 1/72 |
| 2006/0191267 A1* | 8/2006 | Song | F02K 1/06 60/771 |
| 2010/0064659 A1* | 3/2010 | Wang | F02K 1/30 60/226.3 |
| 2011/0072780 A1* | 3/2011 | Somerfield | F16H 25/2247 60/226.2 |
| 2011/0277448 A1* | 11/2011 | Roberts | F02K 1/625 60/226.2 |
| 2011/0318173 A1* | 12/2011 | Ramlaoui | F02K 1/09 415/182.1 |
| 2012/0217320 A1* | 8/2012 | Vauchel | F02K 1/72 239/265.19 |
| 2012/0321456 A1* | 12/2012 | Calder | F02K 1/386 415/208.2 |
| 2013/0200178 A1* | 8/2013 | Welch | F02K 1/09 239/265.19 |
| 2014/0030057 A1* | 1/2014 | Gormley | F01D 17/143 415/126 |
| 2014/0234081 A1* | 8/2014 | Amkraut | F02K 1/09 415/145 |
| 2014/0234090 A1* | 8/2014 | Hurlin | F02K 1/72 415/182.1 |
| 2016/0208737 A1* | 7/2016 | Peters | F02K 1/09 |
| 2017/0292473 A1* | 10/2017 | Stretton | F02K 1/763 |
| 2017/0321633 A1* | 11/2017 | Boileau | B64D 27/16 |
| 2017/0327240 A1* | 11/2017 | Kerbler | B64D 27/16 |
| 2018/0230939 A1* | 8/2018 | Haramburu | F02K 1/70 |
| 2018/0372024 A1* | 12/2018 | Pautis | F02K 1/763 |
| 2019/0316545 A1* | 10/2019 | Heau | B64D 29/06 |
| 2022/0025832 A1* | 1/2022 | Thu | F02K 1/763 |

FOREIGN PATENT DOCUMENTS

| | | |
|---|---|---|
| WO | 2016116709 | 7/2016 |
| WO | 2018100288 | 6/2018 |

* cited by examiner

AIRCRAFT ENGINE NACELLE

CROSS-REFERENCE TO RELATED APPLICATIONS

This application is a continuation of International Application No. PCT/FR2018/053460, filed on Dec. 20, 2018, which claims priority to and the benefit of FR 17/62849 filed on Dec. 21, 2017. The disclosures of the above applications are incorporated herein by reference.

FIELD

The present disclosure relates to an aircraft engine nacelle including a sliding cascade thrust reverser.

BACKGROUND

The statements in this section merely provide background information related to the present disclosure and may not constitute prior art.

An airplane is propelled by one or more propulsion unit(s) comprising a turbojet engine housed in a tubular nacelle. Each propulsion unit is attached to the airplane by a strut generally located under a wing or at the fuselage.

A nacelle generally has a structure comprising an air inlet upstream of the engine, a middle section configured to surround a fan of the turbojet engine, a downstream section accommodating thrust reversal means and configured to surround the combustion chamber of the turbojet engine, and is generally terminated by an ejection nozzle whose outlet is located downstream of the turbojet engine.

The thrust reverser is a device which allows directing the air flow generated by the turbojet engine forwards, allowing both shortening the landing distance and also limiting the stress on the brakes at the undercarriages.

The most modern technologies use bypass turbojet engines; in these turbojet engines, both a hot air flow called primary flow, and a cold air flow called secondary flow are generated via the blades of the fan.

This second flow called cold air flow circulates outside the turbojet engine through an annular passage also called flow path, this flow path being formed between a fairing of the turbojet engine and the inner wall of the nacelle.

In this type of engine, the thrust reverser completely or partially obstructs the cold air flow path, in order to redirect this flow forwardly of the nacelle.

There are several different technologies for making these thrust reversers.

A particularly interesting technology because it reduces the length of the nacelle and consequently limits both the mass of the latter and the drag thereof, consists in designing movable cascade thrust reversers in which the cascades are housed between the casings and the cowl of the fan, during a direct jet operation of the nacelle.

In this type of thrust reverser, the reversal is carried out by translating an outer movable cowl with the cascades which thus come out of their housing and allow the air flow to be redirected forwards.

On such sliding cascade thrust reversers, the outer cowl of the fan, that is to say of the middle section surrounding the fan, is located radially outside the casing of this middle section, the fan cowl being in interface with the fan casing via a front support in the front area.

A downstream end of the fan cowl is, in turn, in interface with an upstream end of the movable cowl of the sliding cascade thrust reverser.

During the deployment of the thrust reverser, the rear edge of the fan cowl is found free (cantilevered) above the cascade vanes. During the closing phase of the thrust reverser, the downstream edge of the fan cowl can then be displaced under the effects of aerodynamic inertia or loading (cascade vanes, external forces, lateral wind) and risks coming into contact either with the cascade vanes, or with the support of the movable cowl.

On the current sliding cascade thrust reversers, the fan cowl is fixed. Fasteners hold the fan cowl on the front support. They remain free at the downstream edge.

However, such apparatuses are used today on nacelles of a substantially reduced size, and the parts are dimensioned so as to use the internal stiffness of the fan cowl to limit the displacements and the unwanted contacts (cascade vanes and support of the movable cowls). These apparatuses cannot be used with large size nacelles.

SUMMARY

This section provides a general summary of the disclosure and is not a comprehensive disclosure of its full scope or all of its features.

The present disclosure falls within the category of movable (sliding) cascade thrust reversers.

The present disclosure provides large size nacelles equipped with a movable cascade thrust reverser device configured so that the movable cowl easily fits into the fan cowl during a passage from the deployed position to the retracted position of the thrust reverser device.

According to the present disclosure, a bypass aircraft engine nacelle is provided. The bypass aircraft engine nacelle comprises an air inlet upstream of the engine, a middle section configured to surround a fan of the engine and delimited externally by a fan cowl supported by a fan casing to which it is fastened in the upstream portion, a downstream section delimiting an annular flow path adapted to circulate the air flow and accommodating thrust reversal devices, the thrust reversal devices comprising a movable cowl associated with at least one actuator to displace the movable cowl between a direct jet position, in which it provides the aerodynamic continuity of the nacelle and an indirect jet position in which it opens a passage in the nacelle by uncovering cascade vanes disposed around this flow path which receive the cold air flow to return it outwards and forwards, the cascade vanes being fastened to the movable cowl and sliding with it, the nacelle being including a series of guide devices distributed about a longitudinal axis of the nacelle, and each including a first guide element secured to the middle section and a second guide element secured to the downstream section.

The term "secured to the middle section or the downstream section" means fastened to the middle section or the downstream section.

Thus, the different guide devices are rigidly connected to each other by the element of the middle section to which they are coupled so that the cohesion of the entire nacelle is reinforced.

More particularly, the first and second guide elements are fastened directly to the middle section and the downstream section respectively.

According to an advantageous version of the present disclosure, at least one of the guide devices at least partially surrounds at least one actuator. Thus, the guiding is carried out compactly.

According to at least one advantageous aspect of the present disclosure, at least one of the guide devices includes a guide element interposed between the fan casing and a portion of at least one actuator.

According to another advantageous aspect of the present disclosure, at least one of the guide devices includes a U-shaped guide shoe carried by the fan casing and an associated U-shaped track, carried by the downstream section.

According to yet other aspects of the present disclosure, taken separately or in combination:

at least one of the guide devices includes an O-shaped guide track associated with the U-shaped guide shoe, and a guide track associated with the O-shaped guide track on a face of the O-shaped guide track opposite to the U-shaped guide shoe;

at least one of the guide devices is dimensioned to provide a locking of the fan cowl and the movable cowl relative to each other for a retracted position of the movable cowl;

at least one of the guide devices is dimensioned to be unlocked after a displacement in a direction of deployment comprised between 1% and 30%, and in one form 20% displacement, of the stroke of the movable cowl;

at least one of the guide devices includes a T-shaped track having a tail engaged between two cascade elements, and a head extending opposite to a flat track carried by the fan cowl;

the nacelle includes at least one device of two distinct types selected from types with a U-shaped track, an O-shaped track, or a T-shaped track;

the nacelle includes two devices of each type;

the nacelle comprises two U-shaped tracks extending in a lower half of the nacelle, two T-shaped tracks extending in a horizontal median plane, and two O-shaped tracks extending in an upper half of the nacelle;

the nacelle includes at least one centering member secured to the movable cowl and extending opposite to a cavity of the fan cowl; and the centering member is configured to carry out a locking of the fan cowl and the movable cowl relative to each other for a retracted position of the movable cowl.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
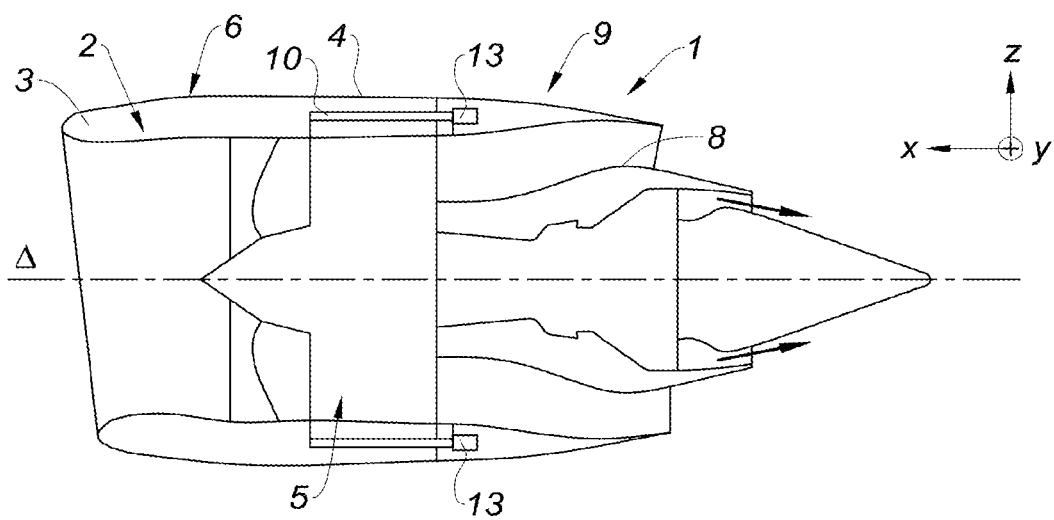
FIG. 1 is a schematic view, in section through a vertical diametrical plane, of a propulsion unit equipped with a nacelle, according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1 to 4, the nacelle 1 has a substantially tubular shape along a longitudinal axis Δ. The nacelle 1 comprises an upstream section 2 with an air inlet lip 3, a middle section 4 surrounding a fan 5 of an engine such as a bypass turbojet engine, and a downstream section.

In particular, the middle section comprises a fan casing 8 surrounding the fan 5, the fan casing supporting a fan cowl 6, the fan cowl being adapted to be impacted by the external air flow of the nacelle 1 during the flight.

The downstream section includes at least one movable cowl 9 including thrust reversal devices. The movable cowls 9 are linked to cascade vanes 10 of the thrust reverser and are driven, during the thrust reversal by actuators, here four electromechanical cylinders, regularly distributed about the axis Δ and including rods 11 having an end 13 secured to the downstream section, and an engine 12 fastened to the middle section. During the displacements of the downstream section, the forces are supported by a rail 14 in the upper portion, in the position commonly called the 12 o'clock position, and a rail 15 in the lower portion, also called the 6 o'clock position by comparison with a dial of a clock.

According to the present disclosure, the nacelle includes a series of guide devices distributed about the longitudinal axis Δ of the nacelle 1. In other words, the guide devices are distributed circumferentially relative to the nacelle, and in one form are evenly distributed. Generally, these guide devices comprise at least one first guide element secured to the middle section and a second guide element secured to the downstream section, the first and second guide elements cooperating with each other to provide a guide link, such as for example a slide link.

Figure 2:
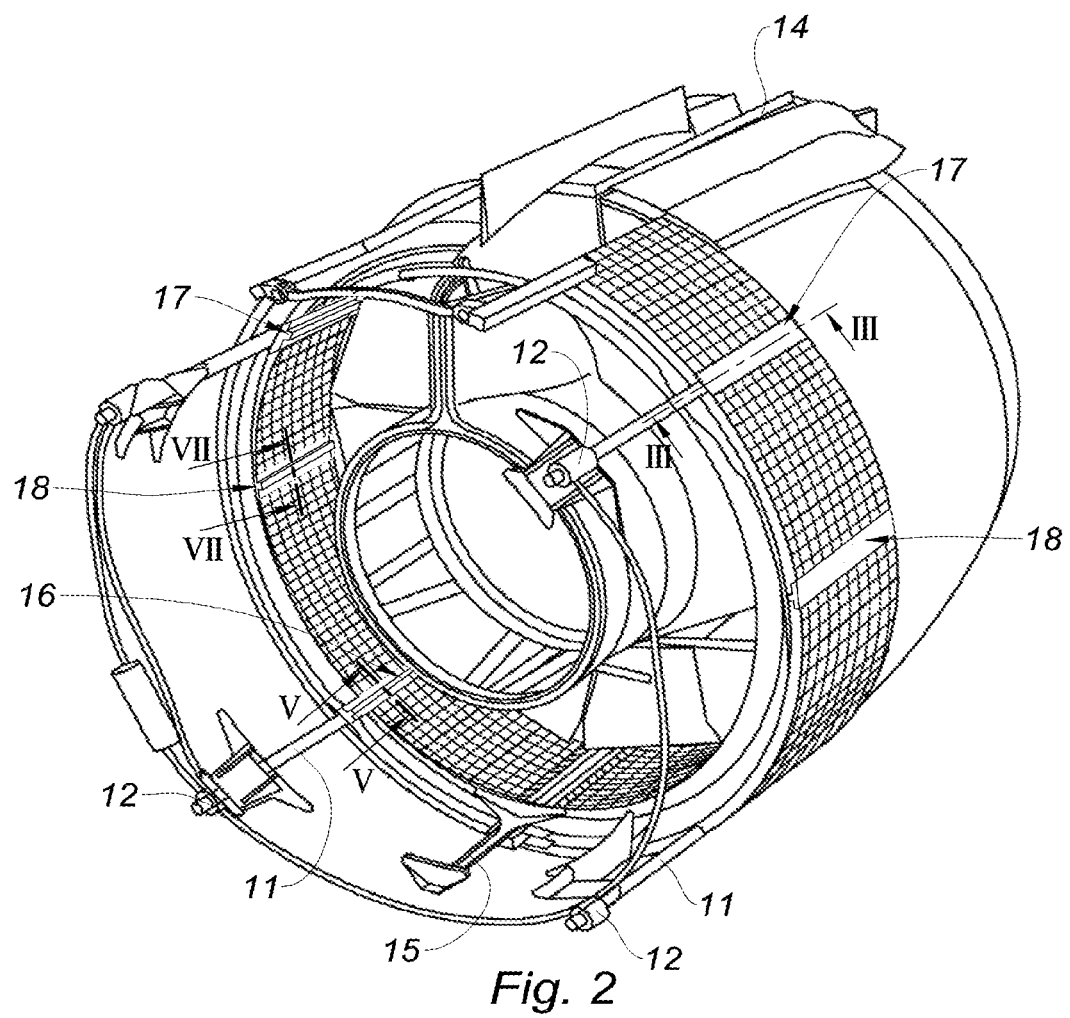
FIG. 2 is a partial schematic perspective view of a nacelle in the deployed position, that is to say in the thrust reversal position, the fixed portion of the fan cowl being removed, according to the present disclosure.
Figure 5:
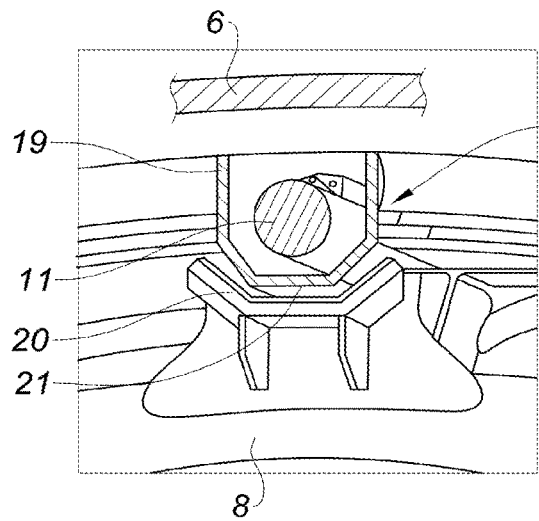
FIG. 5 is a partial perspective view of a U-shaped track and the associated U-shaped shoe, according to the present disclosure.

Referring now to FIGS. 2 and 5, the nacelle 1 comprises guide devices 16 having a first guide element 20 forming a U-shaped shoe and secured to the fan casing 8 cooperating with a second guide element 19, forming a U-shaped guide track and secured to the structure supporting the cascade vanes, and in particular front and rear frames supporting the cascade vanes.

These guide devices 16 have a substantially U-shaped guide track are two and are associated with the lower actuators, that is to say to the actuators extending below a horizontal diametrical plane of the nacelle.

Figure 6:
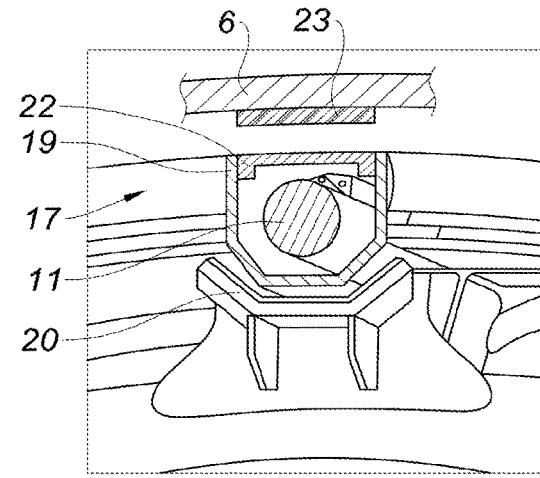
FIG. 6 is a partial perspective view of an O-shaped track and the associated U-shaped shoe, according to the present disclosure.

Now referring to FIGS. 2 and 6, the nacelle 1 comprises guide devices 17 having a first guide element 23 forming a flat track and secured to the fan cowl cooperating with a second guide element 22, forming a complementary inverted U-shaped track and secured to the movable cowl of the thrust reverser.

These two guide devices 17 have a substantially O-shaped guide track and are associated with the upper actuators, that is to say to the actuators extending above a horizontal diametrical plane of the nacelle 1.

Figure 7:
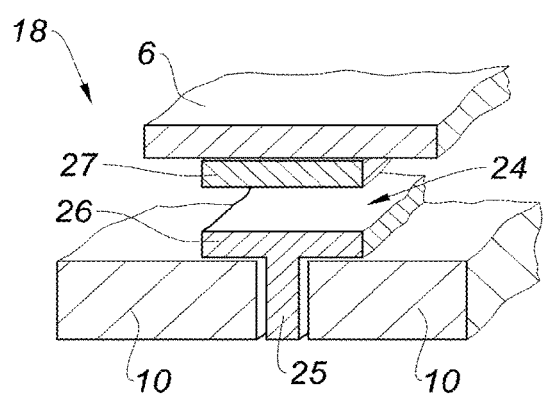
FIG. 7 is a partial perspective view of a T-shaped track and the associated flat track, according to the present disclosure.

Referring now to FIGS. 2 and 7, the nacelle 1 also comprises guide devices 18 having a first guide element 27 forming a flat track and secured to the fan cowl cooperating with a second guide element 24, forming a T-shaped track and secured to the front and rear frames supporting the cascade vanes.

These two T-shaped guide devices 18 are interposed between cascade vanes 10 in a horizontal diametrical plane of the nacelle and located on each side of the nacelle. Of course, this configuration can be changed depending on the configuration of each nacelle 1.

Now referring to FIGS. 1 to 6, the guide devices 16 have a U-shaped guide track each comprise a U-shaped guide track 19 which partially surrounds the rod 11 of an actuator radially under the rod, and whose downstream end, with reference to a gas flow direction for a direct jet position of the thrust reverser device, is fastened to a yoke connected to the engine 12 of the actuator.

A U-shaped shoe 20 is fastened to the fan casing 8 and is in contact with the U-shaped guide track 19. In the vicinity of the downstream end thereof, the bottom 21 of the U-shaped guide track 19 is curved so as to carry out a locking of the fan cowl 6 and the movable cowl 9 relative to each other, by embedding the U-shaped guide track 19 between the U-shaped shoe 20 and the fan cowl 6, for a retracted position of the movable cowl.

The guide devices 17 comprise, as previously, a U-shaped guide track 19, but this is completed by an inverted U-shaped track 22 embedded in the U-shaped guide track 19 to form an O-shaped track which extends opposite to a flat track 23 carried by the fan cowl 6. This O-shaped track is, more generally, a track having a section which has a closed contour, and which completely surrounds the rod 11 of the actuator, while being substantially concentric relative thereto.

In one form, the guide devices 17 at least have at least one transition area during the stroke of the movable cowl between its direct jet and indirect jet positions so that, when the movable cowl is displaced to the deployed thrust reversal position, a release of the clearances takes place between the middle and downstream sections.

The transition area is located over a range of about 1 to 30% of the stroke of the movable cowl taken from its direct jet position, and in another form between 1% and 20%. In yet another form, this transition area is an intermediate area located between a proximal area and a distal area.

Now referring to FIGS. 2-4 and 8, the proximal area correctly engages the movable cowl in the fixed cowl: this area is located at the start of the stroke of the movable cowl when it is opened, that is to say at the end of the stroke when it is closed. In other words, it is located on an area close to the closed position of the thrust reverser, i.e. to the direct jet position. This proximal area corresponds to a range of about 0 to 2% of the stroke of the movable cowl taken from its direct jet position, and in other forms in the range of 1%. The stroke of a movable cowl between its direct jet and indirect jet positions being in the range of 500 mm, this area is reduced to substantially a few millimeters, this for allowing the proper engagement of the movable cowl, in particular of the centering members 28 in cavities 29.

The distal area reduces the contacts on the one hand, between the cascade vanes and a diverting edge, and on the other hand, between the cascade vanes and the movable cowl, the clearance being able to be quite different depending on the dimensions and configurations of the nacelles, as for example depending on the line thickness of the nacelle or the relative positions between the parts. This area is located after the intermediate transition area up to 100% of the stroke of the movable cowl taken from its direct jet position. During this stroke, the clearance released during the transition phase is maintained substantially constant while reducing the aforementioned contacts.

During the stroke of the movable cowl in the proximal area, the radial clearances between the parts are substantially on the order of millimeter, it is an area of the stroke of the movable cowl where the guiding should be relatively fine to allow the accurate closure of the movable cowl without difficulties while allowing the centering of the movable cowl. When the stroke of the movable cowl then enters the transition area, the clearances are thus released, to reach between 3 and 10 times the value of the clearance in the direct jet position, and in numerous forms between 5 and 10 times this value. In this example, the radial clearances thus increase up to about 10 mm to then maintain a similar clearance up to the indirect jet position of the transition area until the end of the stroke, after having traveled the distal area.

In at least one form, the guide devices 17 form a ramp along this transition area which extends over a length comprised between 1% and 30%, and in some forms 20%, of the stroke of the movable cowl taken from its position direct jet. This ramp has an inclination so that, when the movable cowl is displaced to the deployed thrust reversal position, a release of the clearances takes place between the middle and downstream sections. This inclination advantageously has a slope between 0.5 and 5%, and in at least one form about 1%.

Referring to FIGS. 2-4 and 7-8, the guide devices 18 comprise a T-shaped track 24 having a tail 35 engaged between two cascade vanes 10, and a head 26 extending opposite to a flat track 27 carried by the fan cowl 6.

Figure 3:
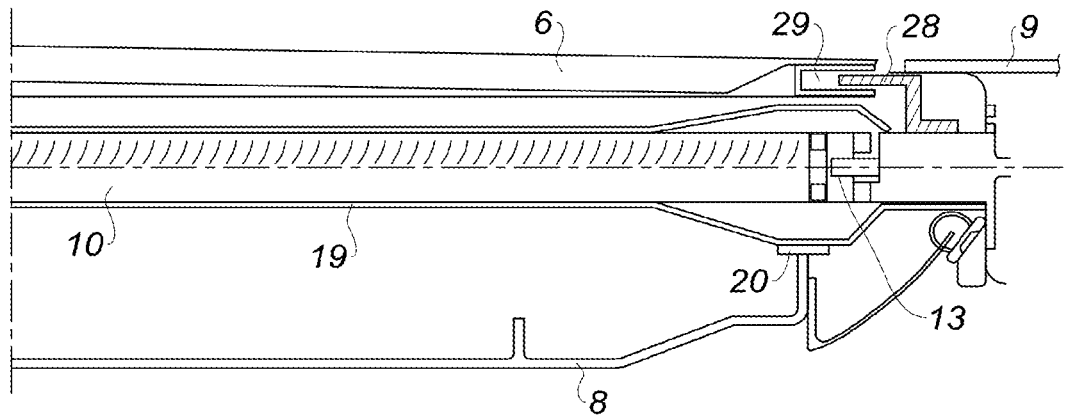
FIG. 3 is a schematic partial cross-sectional view, along the line III-III of FIG. 2, for a retracted position of the thrust reverser.
Figure 4:
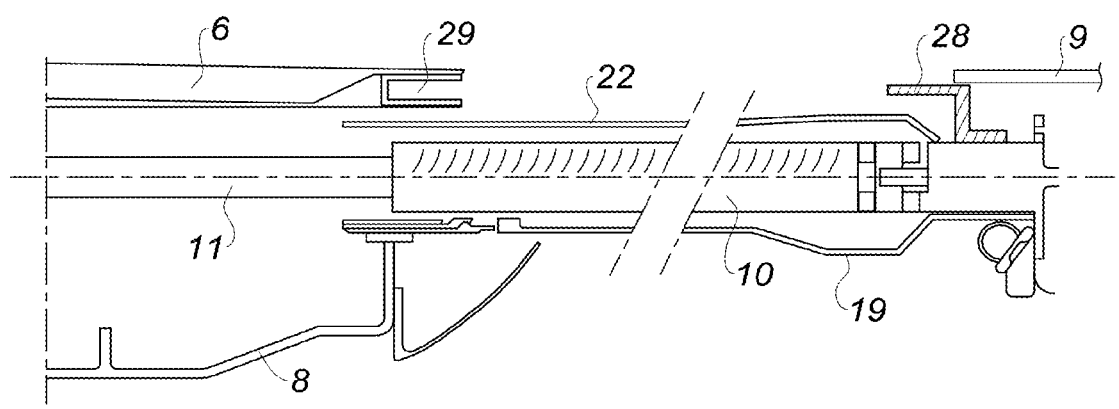
FIG. 4 is a view similar to that of FIG. 3 for a deployed position of the thrust reverser.
Figure 8:
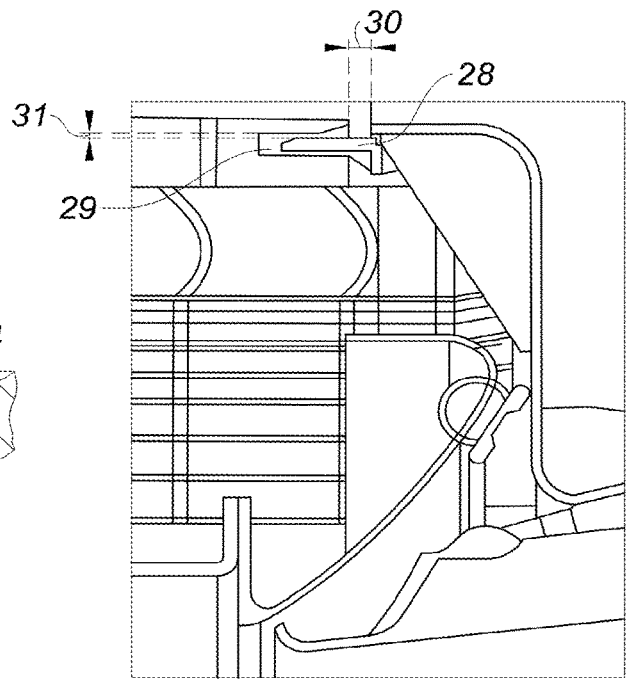
FIG. 8 is a partial detail view of a centering member, according to the present disclosure.

Now referring to FIGS. 3-4 and 8, the guide devices are configured, in particular from the point of view of the clearances between the different components, to be active in the transit position or in the total thrust reversal position. In order to provide a centering of the fan cowl portions relative to each other when the thrust reverser is in a direct jet position, the nacelle includes centering members 28 fastened to the front end of the movable portion and extending axially in cavities 29 at the periphery of the downstream edge of the fan cowl. In order to allow a centering without blocking the fan cowl and the movable cowl relative to each other when the actuators are in abutment, the centering members are mounted with an axial clearance 30 and a radial clearance 31 of a few millimeters.

Of course, the present disclosure is not limited to the described forms and is capable of further variants without departing from the scope of the present disclosure as defined by the claims.

In particular, although the device according to the present disclosure has been described with reference to a variation according to which the guide devices surround the actuators, the present disclosure concerns a nacelle equipped with guide devices regardless of the location of these devices.

Although the present disclosure has been described with reference to a nacelle including guide devices of different types, the present disclosure can be carried out with guide devices of a single type.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A bypass aircraft engine nacelle comprising an air inlet upstream of an engine, a middle section configured to surround a fan of the engine and delimited externally by a fan cowl supported by a fan casing, the fan cowl having an upstream portion fastened to the fan casing, a downstream section delimiting an annular flow path adapted to circulate an air flow, the downstream section accommodating thrust reversal devices, the thrust reversal devices comprising a movable cowl associated with at least one actuator to displace the movable cowl between a direct jet position, in which the movable cowl provides an aerodynamic continuity of the bypass aircraft engine nacelle, and an indirect jet position, in which the movable cowl opens a passage in the bypass aircraft engine nacelle by uncovering cascade vanes disposed around the annular flow path,
wherein the cascade vanes receive the air flow and return the air flow outward and forward of the bypass aircraft engine nacelle,
wherein the cascade vanes are fastened to the movable cowl and move with the movable cowl, wherein the bypass aircraft engine nacelle includes guide devices distributed about a longitudinal axis of the bypass aircraft engine nacelle, each guide device including a first guide element secured to the middle section and a second guide element secured to the downstream section and at least one guide device at least partially surrounding the at least one actuator.

2. The bypass aircraft engine nacelle according to claim 1, wherein at least one guide device includes a guide element interposed between the fan casing and a portion of the at least one actuator.

3. The bypass aircraft engine nacelle according to claim 1, wherein at least one guide device includes a U-shaped guide shoe carried by the fan casing, and a U-shaped guide track carried by the downstream section.

4. The bypass aircraft engine nacelle according to claim 1, wherein at least one guide device includes a U-shaped guide shoe carried by the fan casing, an O-shaped guide track associated with the U-shaped guide shoe, and another guide track associated with a face of the O-shaped guide track opposite to the U-shaped guide shoe.

5. The bypass aircraft engine nacelle according to claim 1, wherein at least one guide device is dimensioned to provide a locking of the fan cowl and the movable cowl relative to each other, in a retracted position of the movable cowl.

6. The bypass aircraft engine nacelle according to claim 5, wherein the at least one guide device is dimensioned to be unlocked after a displacement in a direction of deployment comprised between 1% and 30%, of a stroke of the movable cowl.

7. The bypass aircraft engine nacelle according to claim 1, wherein at least one guide device includes a T-shaped track having a tail engaged between two cascade elements, and a head extending opposite to a flat track carried by the fan cowl.

8. The bypass aircraft engine nacelle according to claim 3, wherein the bypass aircraft engine nacelle includes at least one guide device of two distinct types selected from types with a U-shaped track, an O-shaped track, and a T-shaped track.

9. The bypass aircraft engine nacelle according to claim 8, wherein the bypass aircraft engine nacelle comprises two guide devices of each type.

10. The bypass aircraft engine nacelle according to claim 9, wherein the bypass aircraft engine nacelle comprises two U-shaped tracks extending in a lower half of the bypass aircraft engine nacelle, two T-shaped tracks extending in a horizontal median plane, and two O-shaped tracks extending in an upper half of the bypass aircraft engine nacelle.

11. The bypass aircraft engine nacelle according to claim 1, wherein the bypass aircraft engine nacelle includes at least one centering member secured to the movable cowl and extending opposite to a cavity of the fan cowl.

12. The bypass aircraft engine nacelle according to claim 11, wherein the at least one centering member is configured to carry out a locking of the fan cowl and the movable cowl relative to each other in a retracted position of the movable cowl.

13. The bypass aircraft engine nacelle according to claim 5, wherein the at least one guide device is dimensioned to be unlocked after a displacement in a direction of deployment comprised of 20% of a stroke of the movable cowl.

14. A bypass aircraft engine nacelle comprising an air inlet upstream of an engine, a middle section configured to surround a fan of the engine and delimited externally by a fan cowl supported by a fan casing, the fan cowl having an upstream portion fastened to the fan casing, a downstream section delimiting an annular flow path adapted to circulate an air flow, the downstream section accommodating thrust reversal devices, the thrust reversal devices comprising a movable cowl associated with at least one actuator to displace the movable cowl between a direct jet position, in which the movable cowl provides an aerodynamic continuity of the bypass aircraft engine nacelle, and an indirect jet position, in which the movable cowl opens a passage in the bypass aircraft engine nacelle by uncovering cascade vanes disposed around the annular flow path,
wherein the cascade vanes receive the air flow and return the air flow outward and forward of the bypass aircraft engine nacelle,
wherein the cascade vanes are fastened to the movable cowl and move with the movable cowl, wherein the bypass aircraft engine nacelle includes guide devices distributed about a longitudinal axis of the bypass aircraft engine nacelle, each guide device including a first guide element secured to the middle section and a second guide element secured to the downstream section and at least one guide device including a guide element interposed between the fan casing and a portion of the at least one actuator.

15. A bypass aircraft engine nacelle comprising an air inlet upstream of an engine, a middle section configured to surround a fan of the engine and delimited externally by a fan cowl supported by a fan casing, the fan cowl having an upstream portion fastened to the fan casing, a downstream section delimiting an annular flow path adapted to circulate an air flow, the downstream section accommodating thrust reversal devices, the thrust reversal devices comprising a movable cowl associated with at least one actuator to displace the movable cowl between a direct jet position, in which the movable cowl provides an aerodynamic continuity of the bypass aircraft engine nacelle, and an indirect jet position, in which the movable cowl opens a passage in the bypass aircraft engine nacelle by uncovering cascade vanes disposed around the annular flow path, wherein the cascade vanes receive the air flow and return the air flow outward and forward of the bypass aircraft engine nacelle, wherein the cascade vanes are fastened to the movable cowl and move with the movable cowl, wherein the bypass aircraft engine nacelle includes guide devices distributed about a longitudinal axis of the bypass aircraft engine nacelle, each guide device including a first guide element secured to the middle section and a second guide element secured to the downstream section and, wherein the bypass aircraft engine nacelle includes at least one centering member secured to the movable cowl and extending opposite to a cavity of the fan cowl.

\* \* \* \* \*